United States Patent
Plickert et al.

[11] Patent Number: 5,911,022
[45] Date of Patent: Jun. 8, 1999

[54] OPTICAL COUPLING ARRANGEMENT

[75] Inventors: Volker Plickert; Jörg-R. Kropp, both of Berlin, Germany

[73] Assignee: Siemens Aktiengesellschaft, Munich, Germany

[21] Appl. No.: 08/828,675

[22] Filed: Mar. 31, 1997

[30] Foreign Application Priority Data

Sep. 29, 1994 [DE] Germany ............................. 44 36 204
Sep. 26, 1995 [WO] WIPO ....................... PCTDE9501374

[51] Int. Cl.⁶ ........................................................ G02B 6/30
[52] U.S. Cl. .............................................. 385/49; 385/14
[58] Field of Search ................................ 385/49, 14, 37, 385/31, 88, 92, 94

[56] References Cited

U.S. PATENT DOCUMENTS

| | | | |
|---|---|---|---|
| 5,195,150 | 3/1993 | Stegmueller et al. | 385/33 |
| 5,479,540 | 12/1995 | Boudreau et al. | 385/49 X |
| 5,577,142 | 11/1996 | Mueller-Fiedler et al. | 385/49 X |

FOREIGN PATENT DOCUMENTS

| | | |
|---|---|---|
| 0331331A2 | 9/1989 | European Pat. Off. . |
| 0395854A2 | 11/1990 | European Pat. Off. . |
| 0535690A1 | 4/1993 | European Pat. Off. . |
| 0603549A1 | 6/1994 | European Pat. Off. . |
| 0607881A1 | 7/1994 | European Pat. Off. . |
| 0611975A1 | 8/1994 | European Pat. Off. . |
| 3543558 | 6/1987 | Germany . |
| 4106721C2 | 4/1993 | Germany . |
| 4301456C1 | 6/1994 | Germany . |

*Primary Examiner*—Phan T. H. Palmer
*Attorney, Agent, or Firm*—Herbert L. Lerner; Laurence A. Greenberg

[57] ABSTRACT

An optical coupling array having a first substrate with an electrooptical component, a second substrate having at least one optical fiber end and being formed with a recess open towards the underside of the second substrate and being defined by a mirror face oriented towards the optical fiber end, and a third substrate including at least one lens and being disposed between the first substrate and the second substrate, a beam path extending from the optical fiber end to the electrooptical component via the mirror face and the lens, includes an extension formed on the third substrate and fitting form-lockingly into the opening of the recess on the underside of the second substrate, the extension having a side face forming at least one reference face cooperatable with a corresponding reference face of the second substrate for laterally positioning the third substrate and the lens relative to the second substrate, the top side of the third substrate being solidly joined to the underside of the second substrate, the underside of the third substrate being displaceable on the top side of the first substrate for laterally adjusting the lens with respect to the electrooptical component.

8 Claims, 1 Drawing Sheet

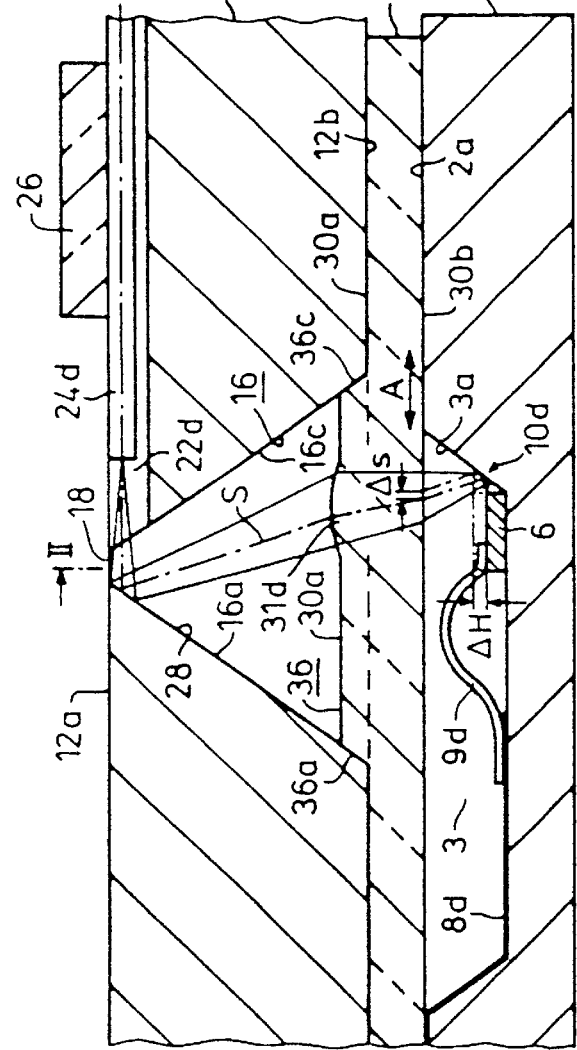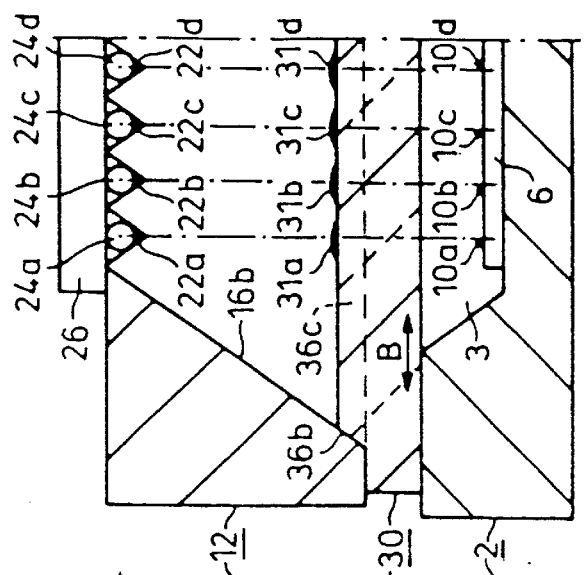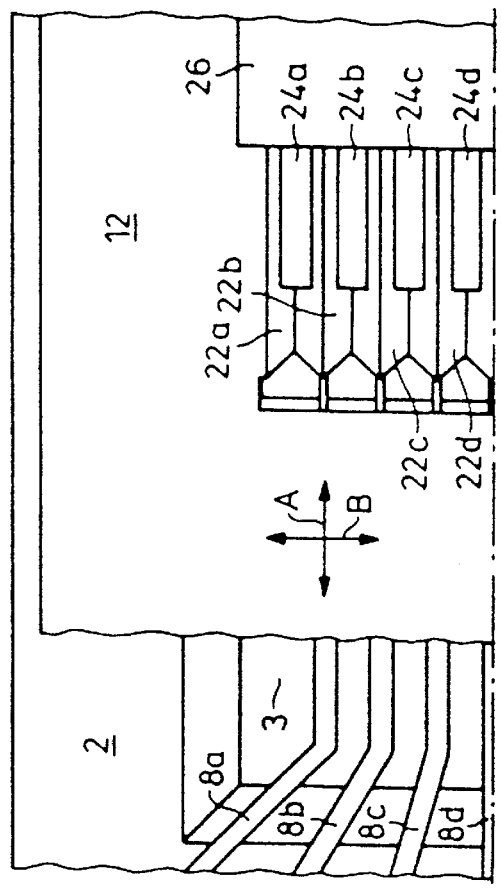

OPTICAL COUPLING ARRANGEMENT

BACKGROUND OF THE INVENTION

FIELD OF THE INVENTION

The invention relates to an optical coupling array having a first substrate with an electrooptical component, a second substrate carrying at least one optical fiber end and formed with a recess open towards the underside thereof and having a mirror face directed towards the optical fiber end, and a third substrate having at least one lens and being disposed between the first substrate and the second substrate, a beam path extending between the optical fiber end and the electrooptical component via the mirror face and the lens.

In optical transmission technology, there is a need for coupling optical fibers and, in particular, monomode optical fibers to electrooptical components (transmitters/receivers) with the highest possible coupling efficiency. The components may be semiconductor lasers, receiving diodes, or optoelectronic integrated circuits. Experience shows that the tolerances needed cannot be adhered to solely by employing high-precision, controlled anisotropic etching techniques in silicon, especially with respect to the etching depths, for example, in the case of trenches or wells with flat bottom surfaces. In the arrangements known heretofore, additional costly adjustments have therefore been necessary.

An arrangement known from the published German Patent Document DE-C1 43 01 456 for coupling an optical fiber to an electrooptical component includes a first substrate which, in a first indentation, receives an edge-emitting laser diode and, in a second indentation, receives an optical imaging element. A coated, light-refracting side wall deflects entering radiation away towards the underside of the first substrate. A second substrate is displaceable arbitrarily with the top side thereof along the underside of the first substrate in a horizontal plane, and is formed with indentations on the underside thereof for receiving the optical fiber therein and for the light-refracting, reflective deflection of the radiation. The conventional coupling array is suitable only for wavelengths of light for which the substrate material is transmissive, because the beam path extends predominantly through the substrate material.

The published European Patent Document EP A2 0 395 854 discloses an optical coupling array which has a first substrate with a first indentation, beginning at the upper side thereof and created by anisotropic etching, wherein an electrooptical component is arranged. Another indentation which is V-shaped has a spherical lens mounted therein, the positioning of which with respect to the laser can be preadjusted to an accuracy of merely 1 to 2 $\mu$m. Geometric tolerances of the laser and spherical lens are another factor; height differences (chip height tolerance) of the emitter edge of the laser cause squint angles, because of the imaging properties of the lens. A second substrate carries an optical fiber and rests with its underside on the top side of the first substrate and is displaceable thereon. The beam path extends between the optical fiber end and the components via a mirror face and the lens.

To adapt the distant fields or light spots of the component (with a laser light spot of approximately 2 $\mu$m) and the optical fiber end (light spot of about 10 $\mu$m), the distance from component to lens (subject distance) is selected to be at a ratio of approximately 1:5 to the distance from the lens to the optical fiber end (image distance). The geometrical tolerances cause a beam offset in front of the lens; this offset is amplified in the ratio of the subject distance to the image distance and causes a considerable worsening of coupling efficiency. At least the second substrate must be used during the mounting process.

The published European Patent Document EP-A2 0 331 331 (FIG. 10) discloses an optical coupling array of the type referred to in the introduction hereto, having a first substrate with an indentation wherein an electrooptical component is disposed. A second substrate is formed with a recess open towards the underside thereof and having a mirror face directed towards an optical fiber end. In a sandwich-like construction, a third planar substrate is disposed between the first and second substrates and contains at least one lens. Further details as to how the three substrates are fixed and how the components received by the substrates are adjusted cannot be found in EP-A2 0 331 331.

SUMMARY OF THE INVENTION

It is accordingly an object of the invention to provide an optical coupling array and, more particularly, such an array wherein mounting or component tolerances and, in particular, height tolerances of the optically active region of the electrooptical component can be balanced out in a single adjustment operation which is as simple as possible.

With the foregoing and other objects in view, there is provided, in accordance with the invention, an optical coupling array having a first substrate with an electrooptical component, a second substrate having at least one optical fiber end and being formed with a recess open towards the underside of the second substrate and being defined by a mirror face oriented towards the optical fiber end, and a third substrate including at least one lens and being disposed between the first substrate and the second substrate, a beam path extending from the optical fiber end to the electrooptical component via the mirror face and the lens, comprising an extension formed on the third substrate and fitting form-lockingly into the opening of the recess on the underside of the second substrate, the extension having a side face forming at least one reference face cooperatable with a corresponding reference face of the second substrate for laterally positioning the third substrate and the lens relative to the second substrate, the top side of the third substrate being solidly joined to the underside of the second substrate, the underside of the third substrate being displaceable on the top side of the first substrate for laterally adjusting the lens with respect to the electrooptical component. In regard to the foregoing, it is noted that a form-locking connection is one which connects two elements together due to the shape of the elements themselves, as opposed to a force-locking connection which locks the elements together by force external to the elements.

In accordance with another feature of the invention, the array includes a plurality of electrooptical components forming an edge-emitting laser diode bar, and a corresponding plurality of associated lenses and optical fiber ends, the first substrate being formed with an indentation having a second mirror face for deflecting the respective beam path between a plurality of the electrooptical components and a plurality of the lenses.

In accordance with a further feature of the invention, the third substrate is formed of silicon, and has a polished underside.

In accordance with an added feature of the invention, the one optical fiber end is received in an indentation formed in the second substrate, and the recess formed in the second substrate is continuous and has an opening at the top side of the second substrate serving to orient the indentation for the one optical fiber end.

In accordance with an additional feature of the invention, the first substrate is formed with an indentation, and the third substrate covers indentation formed in the first substrate entirely.

In accordance with yet another feature of the invention, the third substrate includes a plurality of lenses, and the plurality of lenses are Fresnel lenses.

In accordance with yet an added feature of the invention, the third substrate includes a plurality of lenses which are integral components thereof.

In accordance with a concomitant feature of the invention, the plurality of lenses are integral components of the extension formed on the third substrate.

In the context of the description in the instant application, the general term "beam path" means the course of light from the component to the optical fiber end in the case of a transmitting electrooptical component, and in the opposite direction for a receiving component.

An essential advantage of the invention is that the beam path extending between the optical fiber end and the lens preferably entirely outside the material of the first and second substrates, and being independent in terms of the wavelength thereof from the transmission behavior of this material, can be kept within allowable tolerances without active adjustment, solely by the cooperation of the reference faces. The side face of the extension advantageously serves directly as the reference face of the third substrate; it fits form-lockingly into the opening of the recess on the underside of the second substrate. Deviations of the beam path extending either directly or via one further mirror face between the lens and the component may be compensated for by relative displacements laterally, that is, lateral with respect to the beam path, between the underside of the third substrate and the top side of the first substrate. Because of the beam path ratio, advantageously, only comparatively slight motions are needed to achieve this.

The third substrate, by the connection of its surface to the underside of the second substrate, forms a one-piece, easily manipulated, compact component of the coupling array of the invention. The component in the indentation of the first substrate can preferably be contacted beforehand with the terminals of a housing or a receptacle, for example, by bonding, so that the triggering of the component necessary for active adjustment can be effected beforehand via these terminals. Another advantage of the invention comes to the foreground when an edge-emitting transmitting component is used, the beam of which passes to the lens via a second mirror face constructed on the first substrate because, as a result of the high tolerance of the component, light signals projected to various heights lead via the second mirror face to only a translational offset but not any angular error. The translational offset can be entirely compensated for by lateral adjustment of the third substrate on the top side of the first substrate.

An advantageous embodiment of the array according to the invention with a view to a multiple arrangement (coupling array) contemplates that a plurality of electrooptical components in the form of an edge-emitting laser diode bar and a corresponding plurality of associated lenses and optical fiber ends are provided, and that the indentation in the first substrate is provided with a second mirror face, which deflects the respective beam path between the components and the lenses.

To make especially precise adjustment possible, the third substrate is preferably formed of silicon and has a polished underside. The underside is preferably oriented plane parallel to the plane in the second substrate which is defined by the optical fiber end or ends.

Another advantageous feature of the invention contemplates that the recess of the second substrate be continuous, and that its opening at the top side of the second substrate serve to orient an indentation for the optical fiber end.

In a dual function, the third substrate can also serve to encapsulate the component in a hermetically sealed manner, in that in an advantageous further feature of the invention, the third substrate entirely covers the indentation of the first substrate. Preferably, the lenses formed on the third substrate may be Fresnel lenses. Advantageously, however, the lenses may also be integral components of the third substrate, preferably of the extension formed thereon. The thickness of the material forming the extension can thus serve in a dual function to provide strong lenses as well.

Other features which are considered as characteristic for the invention are set forth in the appended claims.

Although the invention is illustrated and described herein as embodied in an optical coupling arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

BRIEF DESCRIPTION OF THE DRAWINGS

FIG. 1 is a cross-sectional view of a coupling array according to the invention;

FIG. 2 is a sectional view of FIG. 1 taken along the line II—II in the direction of the arrows; and FIG. 3 is a plan view of FIG. 1, partly broken away and with a second substrate of the coupling array partly removed.

DESCRIPTION OF THE PREFERRED EMBODIMENTS

Referring now more particularly to the figures of the drawing, a first substrate 2 shown in FIGS. 1 to 3 is formed of monolithic silicon having an orientation of 100 and receiving a transmitter array 6 in a well 3 formed therein by anisotropic etching starting inwardly from the top side 2a thereof. The transmitter array 6 is formed as an edge-emitting laser diode bar and includes a plurality of electrooptical components (laser diodes) 10a, 10b, 10c and 10d which are individually triggerable via individual supply leads 8a, 8b, 8c and 8d and bonding wires (only one bonding wire 9d being shown connected to the supply lead 8d). The components of the transmitter array 6 are oriented towards a mirror-coated surface 3a serving as a wall defining the well 3.

A second substrate 12 is formed of silicon structured on both sides thereof. Into the second substrate 12 formed of monolithic silicon having an orientation of 100, a recess 16 of approximately V-shaped cross section is etched, widening toward the underside 12b of the second substrate 12 and, by the formation of an opening 18 at the top side 12a of the second substrate 12, the recess 16 also penetrates the top side 12a. An ensuing mask process forms V-shaped grooves 22a, 22b, 22c and 22d on the top side 12a, the grooves being of such depth that optical fiber ends 24a, 24b, 24c and 24d disposed therein protrude a few μms (micrometers) beyond the plane of the surface 12a and are simultaneously pressed into the V grooves 22a to 22d and fixed by a transversely extending, small glass plate 26 secured by adhesive. The mask for structuring the V grooves can be positioned very accurately, because the orientation is performed relative to the opening 18. Of the flanks or walls 16a, 16b and 16c defining the recess 16, at least the wall 16a opposite the optical fiber ends 24a, 24b, 24c and 24d is formed as a mirror face 28 by metal vapor deposition.

A third substrate 30 disposed between the first and the second substrates 2 and 12 has a number of lenses 31a, 31b, 31c, 31d arranged in a row (a so-called lens array) corresponding to the number of electrooptical components or optical fiber ends 24a to 24d. As an alternative to the embodiment shown, the lenses 31a, 31b, 31c and 31d do not have to be formed as integral components of the third substrate, of the same material thereof and in the same region as the extension 36, but instead, at suitable locations on the surface 30a of the third substrate 30, they may be formed as Fresnel lenses. The material of the third substrate 30 is optimized in accordance with the wavelength of light to be transmitted. The third substrate 30, for example, is formed of silicon wherein lenses of such type are formed that the remote field of the electrooptical components 10a, 10b, 10c and 10d (having a spot diameter of 1 to 2 μm) is adapted by suitable enlargement to the remote field of the optical fiber ends (having a spot diameter of 10 μm, for example). As a result of two successive mask processes on the surface 30a, anisotropically etched flanks (only the walls or flanks 36a, 36b and 36c being visible in the figures of the drawings) are produced laterally of the refractive or diffractive lenses 31a, 31b, 31c and 31d. These walls or flanks 36a to 36c form the side faces of the extension 36 which has a truncated pyramid shape and contains the lenses 31a to 31d.

In the region of the underside 12b of the second substrate 12, the recess 16 is of such dimensions that the extension 36 fits precisely into the recess 16. The walls or flanks 36a, 36b and 36c and a further side of the truncated pyramid of the extension 36, the further side being non-illustrated in the figures of the drawing but being disposed opposite the flank or wall 36b, serve as reference faces, which cooperate with the corresponding reference faces 16a, 16b and 16c (and a further face, not shown, which is disposed opposite the face 16b). The third substrate 30 is consequently completely positioned thereby and fixed in the lateral direction of the second substrate 12. Thus, the lenses 31a, 31b, 31c and 31d are positioned with respect to the mirror face 16a, on the one hand, and the optical fiber ends 24a, 24b, 24c and 24d, on the other hand. The underside 12b of the substrate 12 and the top side 30a of the substrate 30 are joined together, for example, by adhesive bonding, prior to any active adjustment.

The underside 30b of the third substrate 30 is polished and is displaceable in the lateral direction represented by the double-headed arrows A and B at the top side 2a of the first substrate 2, and covers the indentation 3 entirely.

For the lateral adjustment of the array according to the invention, the components 10a, 10b, 10c and 10d are triggered by the previously established contacting (the leads 8a, 8b, 8c and 8d and bonding wires). By measuring the light coupled into the optical fiber ends, a lateral displacement of the third substrate 30, as an integral component with the second substrate 12, is performed relative to the first substrate 2 in the direction of the double-headed arrows A and B, until an optimal coupling efficiency is attained. A height difference ΔH of the components 10d, shown exaggerated in FIG. 1, leads via the mirror face 3a solely to a translational offset Δs, but not to a squint angle. The offset Δs can be compensated for by the lateral adjustment of the third substrate 30 with comparatively slight motions in the direction A.

In the exemplary embodiment shown, the beam path S extends between one optical fiber end (24d, for example) and the associated electrooptical component (10d, for example) via the mirror face 28, the lens 31d, and the mirror face 3a to the component 10d.

The array according to the invention may be mounted by the first substrate 2 thereof on a metal base plate in a conventional manner, with the optical fiber ends leading horizontally out of the array. The thickness of the substrates 2, 12 and 30 is optimized in accordance with the optimal remote field adaptation between the components and the optical fiber ends and the required imaging scale. The Z tolerance (in the direction of the beam path S and the optical fiber ends, respectively), which results from the deflection of the height tolerance of the components but is considerably less critical with respect to the coupling efficiency, can be compensated for as necessary by displacing the optical fiber ends in the V grooves 22a, 22b, 22c and 22d.

We claim:

1. An optical coupling array having a first substrate with an electrooptical component, a second substrate having at least one optical fiber end and being formed with a recess open towards the underside of the second substrate and being defined by a mirror face oriented towards the optical fiber end, and a third substrate including at least one lens and being disposed between the first substrate and the second substrate, a beam path extending from the optical fiber end to the electrooptical component via the mirror face and the lens, comprising an extension formed on the third substrate and fitting form-lockingly into the opening of the recess on the underside of the second substrate, said extension having a side face forming at least one reference face cooperatable with a corresponding reference face of the second substrate for laterally positioning the third substrate and the lens relative to the second substrate, the top side of the third substrate being solidly joined to the underside of the second substrate, the underside of the third substrate being displaceable on the top side of the first substrate for laterally adjusting the lens with respect to the electrooptical component.

2. The array according to claim 1, wherein the third substrate includes a plurality of lenses which are integral components thereof.

3. The array according to claim 2, wherein the plurality of lenses are integral components of said extension formed on the third substrate.

4. The array according to claim 1, wherein the one optical fiber end is received in an indentation formed in the second substrate, and the recess formed in the second substrate is continuous and has an opening at the top side of the second substrate serving to orient said indentation for the one optical fiber end.

5. The array according to claim 1, wherein the first substrate is formed with an indentation, and the third substrate covers said indentation of the first substrate entirely.

6. The array according to claim 1, wherein the third substrate includes a plurality of lenses, and wherein the plurality of lenses are Fresnel lenses.

7. The array according to claim 1, including a plurality of electrooptical components forming an edge-emitting laser diode bar, and a corresponding plurality of associated lenses and optical fiber ends, said first substrate being formed with an indentation having a second mirror face for deflecting the respective beam path between a plurality of the electrooptical components and a plurality of the lenses.

8. The array according to claim 1, wherein the third substrate is formed of silicon, and has a polished underside.

* * * * *